United States Patent [19]

van den Brink

[11] Patent Number: 4,602,594
[45] Date of Patent: Jul. 29, 1986

[54] DEVICE FOR PACKING POULTRY IN BOXES OR CONTAINERS

[76] Inventor: Hendrikus G. van den Brink, Edeseweg 111, 6732 Da Harskamp, Netherlands

[21] Appl. No.: 675,686

[22] Filed: Nov. 28, 1984

[30] Foreign Application Priority Data

Nov. 28, 1983 [NL] Netherlands .................. 8304074

[51] Int. Cl.$^4$ ............................................. A01K 29/00
[52] U.S. Cl. ............................................................. 119/82
[58] Field of Search ............................. 119/82; 56/364

[56] References Cited

U.S. PATENT DOCUMENTS

| 2,795,100 | 6/1957 | Sund ........................... 56/364 |
| 3,514,937 | 6/1970 | Butog .......................... 56/364 |
| 3,785,349 | 1/1974 | Christopher ................ 119/82 |
| 3,921,588 | 11/1975 | Ledwell ...................... 119/82 |
| 4,467,745 | 8/1984 | Ledwell et al. ............. 119/82 |

Primary Examiner—Jay N. Eskovitz
Attorney, Agent, or Firm—Olson and Olson

[57] ABSTRACT

Device for packing poultry in a box comprising an endless belt (19) running over a plurality of rolls (14–18) with horizontal axles and provided with spaced apart rows of fingers (20), which are hingedly connected with the belt (19) said belt (19) having an upwardly running part at which the fingers project forwardly and move from the floor with the belt and the picked-up poultry upwardly said poultry in normal position being taken over by a series of substantially horizontal guide cams (25) at the level of the top reverse roll (15) at which level the fingers are withdrawn and move downwardly with the belt while the poultry is taken over by endless belts (27,29) which feed them to a feed regulating device (30) which discharges into a box (36).

10 Claims, 2 Drawing Figures

DEVICE FOR PACKING POULTRY IN BOXES OR CONTAINERS

BACKGROUND OF THE INVENTION

The invention relates to a device for packing poultry in boxes or containers. It is known to do this with a conveyor belt running close to the floor, to which the poultry is driven, and which takes the poultry along as soon as the latter has gone onto the belt and then carries it to transport containers.

This device does not work satisfactorily.

SUMMARY OF THE INVENTION

The object of the invention is to produce a device which is particularly suitable for picking up and packing poultry which is in a concentrated layer on the floor of a room, such as a pen, and with which it is possible to pick up the poultry without damaging it and transfer it to means which transfer it in the proper manner to boxes or containers.

This object is achieved in the first place according to the invention by the device comprising:

a pick-up device provided with an endless belt or the like which runs over reverse wheels or rolls with horizontal axles, said belt having a part beginning near the floor and running upwards, which is provided with projecting series of fingers with openings between them, which are attached to the belt in such a way that in the upgoing part of the belt they are facing away from it, but near the bottom reverse wheel or roll in front of that can slide forwards over the floor;

a guide cam which grips between the fingers near the top reverse wheel and runs to a conveyor belt or belts situated outside the track of the fingers;

and a feed-regulating device at the discharge end of the belt(s) and a container or box conveyor connecting with the feed-regulating device.

The fingers of the pick-up device grip between the legs of the poultry and pick it up, each series of fingers picking up a row of chickens or the like. They are then raised with the upgoing part of the conveyor belt or chain, where guiding is taken over by the fingers of a cam. In this way the birds remain in their normal position and are pushed further over the cam by the fingers until they slide over it to a conveyor belt after the fingers have been withdrawn from the cam. The attachment of the fingers is such that they slide forward over the floor or ground at the front and bottom reverse wheel or roll.

This can be achieved in a simple manner by the fingers being hingedly connected to the belt in such a way that in the upgoing part they are held by a stop in an approximately horizontal position facing away from the belt, and in the downgoing part can swing against the belt, and by having near the bottom reverse wheel or roll a curved guide element which guides the fingers, which are hanging down in the returning part, towards the floor.

In the upgoing part of the belt, the fingers are therefore in a position in which they carry the birds which have been picked up, while after they have passed the top reverse wheel(s) the fingers fall back downwards against the belt and will not swing down further until they have reached the bottom reverse wheel, where they run against the floor and, sliding forward over the floor underneath the front and bottom reverse wheel, slide forward over the floor.

This guiding towards the floor can be controlled with a guide element, for example a plate which runs towards the floor and ensures that the fingers which are hanging down do not crash against the floor. It is desirable for each belt to have a lower part near the floor gradually running towards it and for the guide plate to follow this part, preferably in the shape of a curve. This whole pick-up device can be disposed adjustably on a mobile underframe which is provided with the feed-regulating device and the container or box conveyor, so that adjustment to floor height and the like is possible.

According to the invention, the feed-regulating device preferably consists of a rotatable disc into which the conveyor belt leads, and which is provided with a revolving wall with outlet opening on the side facing the container conveyor, said outlet opening being provided with a movable door, and there being a slide plate located between the outlet opening and the edge of a container. A quantity of poultry is assembled on the disc and is carried portion-wise via the opening when the door is opened and via the slide plate connected therewith to a container or box. When a container or box is full, it is pushed on and replaced by another, which can take place using horizontal conveyors or a destacking and stacking device.

The device is preferably designed in such a way that the wall with door is rotatable about the axis of rotation of the disc and the slide plate extends over the width of the range of rotation of the wall opening.

This means that when the door is opened the feed-regulating device can deliver a stream of poultry onto the slide plate which conveys them over the whole width of a box or container.

It is, of course, also possible for the wall to have two openings with accompanying doors, and for each opening to connect to a slide plate to the container.

The design of the door can be such that it consists of two parts which are hingedly connected to each other, one of which when viewed in the direction of rotation of the disc past the opening is hingedly connected to the wall, while the second is hingedly connected to the edge of the first part facing away from the wall, and is held by a spring in an angular position in relation to the first part, and there are means for moving the door away from or towards the opening in such a way that the second part, on contact with the wall at a point before the opening, slides over the wall against the direction of rotation during the closing movement. This means that each time the door closes the birds are moved away from the opening and therefore cannot become jammed in it.

The poultry, which is lifted by means of the pick-up device and is carried to a conveyor belt, can be taken to a conveyor device consisting of two transverse belts which connect with the discharge end of the cam and whose working faces move towards each other and lead to a belt situated between them which conveys away from the cam in the direction of the feed-regulating disc. The stream of poultry which is delivered each time by a series of fingers is then carried in concentrated form to the central belt, which takes it to the feed-regulating device.

The invention will now be explained in greater detail with reference to the drawings of a preferred embodiment.

DESCRIPTION OF THE PREFERRED EMBODIMENT

Figure 1:
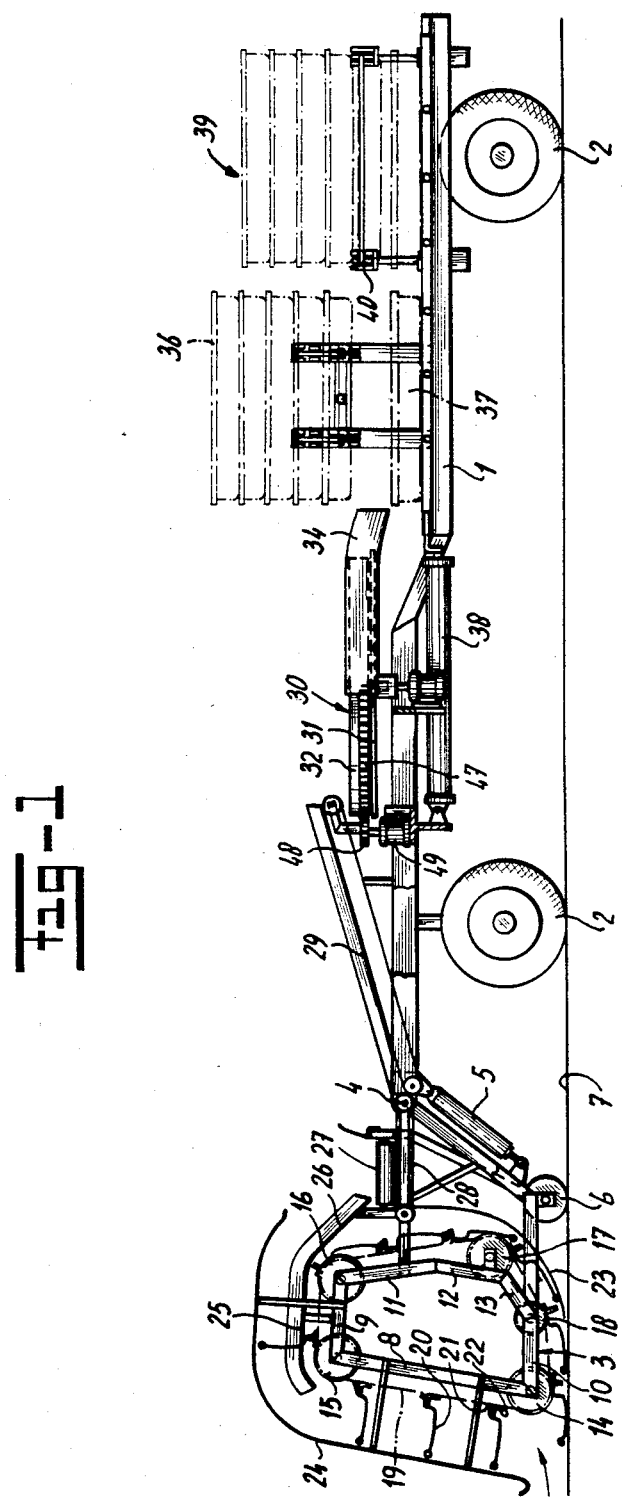
FIG. 1 shows a side view of an embodiment of the device according to the invention and FIG. 2 shows a top view of the embodiment of FIG. 1.

The device shown in the drawings consists of an underframe 1 with wheels 2.

This underframe carries on its front side a sub frame 3, which at 4 is hingedly connected about a horizontal axis to the underframe 1 and is adjustable in height by means of the hydraulic cylinder 5, for example for passing thresholds and the like. This sub frame can also rest on the floor 7 on wheels 6.

The sub frame 3 consists of a number of polygonal frame parts, positioned in vertical planes and each consisting of the forward upgoing parts 8, the top and bottom horizontal parts 9 and 10, and three rearward parts 11, 12 and 13 standing at an angle to each other.

Supported in or near the corners of these polygonal parts are reverse rolls, indicated by 14, 15, 16, 17 and 18, over which runs an endless belt 19.

Instead of rolls, it is, of course, also possible to use chain wheels, over which run endless chains which are linked together in the transverse direction.

Attached on this endless belt 19 or on the chains are series of fingers 20 which at 21 are hingedly connected to the belt or chain and are supported by an angle abutment section 22. This support is given in the upgoing part which is located between the reverse rolls or wheels 14 and 15.

After passing the roll 16, the fingers 20 can, however, swing downwards, as shown, and after passing the rolls 17 and 18 and being guided by the plate 23 they are taken by force of gravity against the floor 7 and from there slide horizontally over the floor from roll 18 to roll 14.

A large quantity of poultry can be picked up by the fingers 20 sliding over the floor, and it is then carried up, in the process the guide plate 24 on the outside of the upgoing part ensuring that the birds cannot escape from their support on the fingers 20.

Near the top reverse wheel 15 the guiding is taken over by a cam 25 which projects into the openings between the fingers, which during the movement from the reverse roll 15 to the reverse roll 16 still effect the conveyance of the poultry over the cam 25, but which then fall down so that the poultry slides over the sloping part 26 of the cam 25 onto a conveyor belt 27.

This picking up is preferably carried out in twilight or in the dark.

The conveyor belts 27 run crosswise towards each other to a conveyor belt 28 which runs in the longitudinal direction and leads to an upgoing conveyor belt 29, which leads to a feed-regulating device which in the general sense is indicated by 30 and consists of a rotatable disc 31 and a stationary revolving wall 32 which is provided with a discharge opening 33. At the discharge opening there is a guide plate 34, the discharge edge 35 of which corresponds to the width of a container 36. The containers 36 are in a stack, as shown in FIG. 1, and in a manner known per se an empty container can be removed each time from the stack and taken to the position indicated by 37. When the container 37 has been filled, it can be pushed up to the right by the cylinder 38 in FIG. 1, where a new stack 39 of full containers is formed in a known way with vertically upward and downward moving ratchet mechanisms 40, which can always lift the bottom container by gripping a rim flange.

Figure 2:
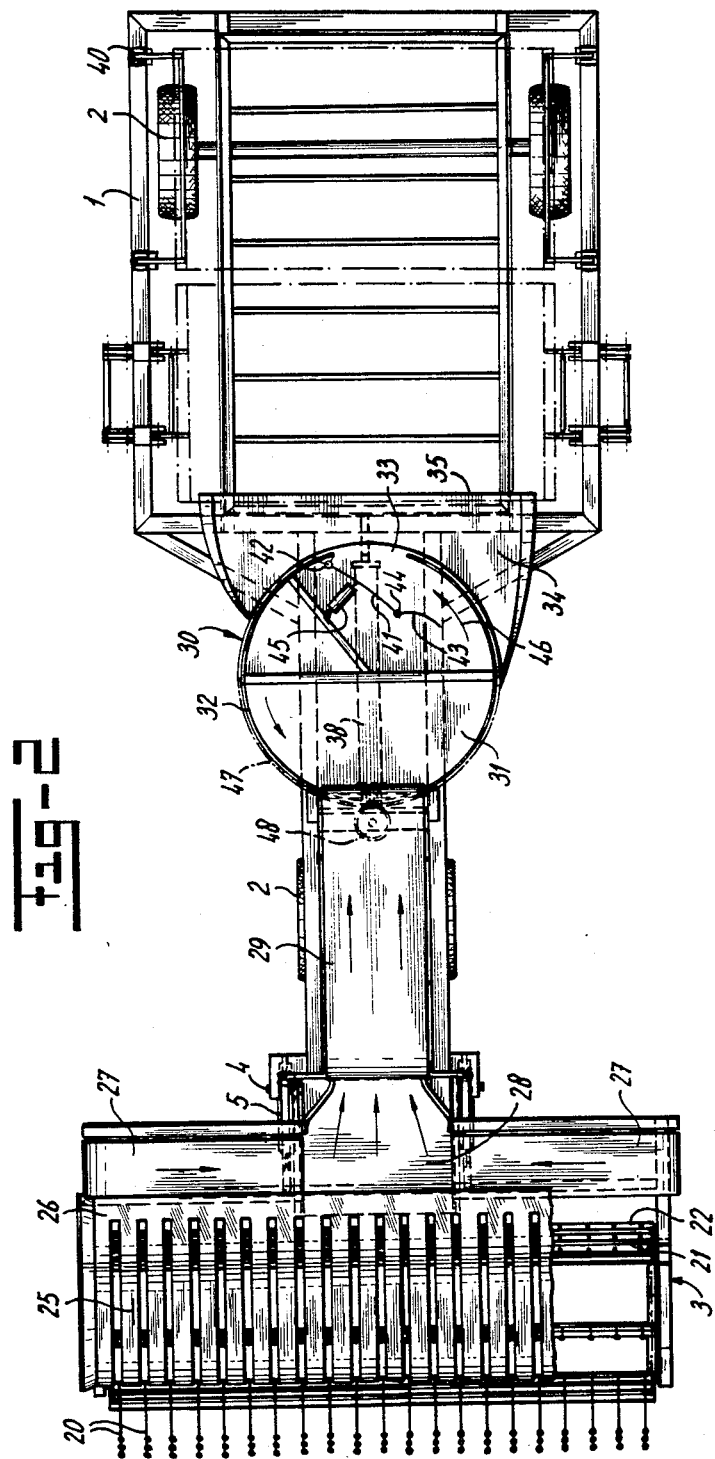

The feed-regulating device 30 is provided at the discharge opening 33 with a door, comprising a first part 41 which at 42 is hingedly connected to the wall 32, and a part 43 which at 44 is hingedly connected to the first part 41 and is held by a spring in an angular position in relation to the part 41. At 45 there is a cylinder with which this door 41, 43 can be opened or closed. FIG. 2 shows the door in the open position, so that a quantity can be discharged via the opening 33. If the door is shut, the part 43 moves against the wall 32 and in the process will make a pivoting movement in relation to the part 41, so that this part 43 slides along the inside of the wall 32 in the opposite direction to the direction of rotation of the disc 31 indicated by the arrow 46. This prevents birds from being jammed.

The wall 32 is provided on its outer periphery with a crown gear 47 which can be engaged by a gear wheel 48 which is connected to a motor 49. By rotating the wall 32 and thus the opening 33, it is now possible when the door is open to achieve distribution of a series of birds over the width of the slide plate 34 and thus of a container 36. Instead of one single discharge opening 33, it is, of course, also possible to provide the feed-regulating device with several discharge openings which lead via slide tracks to containers.

The container conveyance takes place here by destacking from a stack and stacking full containers. It is, of course, also possible to use only horizontal conveyance of the containers to the underframe 1 and, if necessary, to carry out the stacking elsewhere, and it is also possible to do the conveyance of the containers by hand.

I claim:

1. A device for packing poultry in boxes or containers, comprising:
   (a) a wheel-mounted main frame,
   (b) a poultry pickup conveyor sub-frame at one end of the main frame,
   (c) an outfeed conveyor system extending rearwardly of the sub frame,
   (d) an endless pickup conveyor on the sub-frame, the pickup conveyor having an upwardly moving front portion, a rearwardly moving upper discharge portion, a downwardly moving rear portion and a forwardly moving bottom pickup portion,
   (e) a plurality of fingers mounted pivotally on the pickup conveyor and arranged in a plurality of longitudinally spaced series of laterally spaced apart fingers over the length of the conveyor,
   (f) an abutment on each finger arranged to releasably abut the conveyor in the upwardly moving front portion and rearwardly moving upper discharge portion,
   (g) the fingers being pivotally connected to the conveyor to swing solely by gravity between a position in which they are held by the abutment to extend outwardly substantially perpendicularly from the upwardly moving front portion and rearwardly moving upper discharge portion and a position in which they swing downwardly by gravity adjacent the downwardly moving rear portion, and
   (h) a curved guide mounted behind the rear portion and below part of the bottom portion for guiding the fingers to project forwardly adjacent and substantially parallel to a poultry support surface.

2. The device of claim 1 including a guide cam on the sub-frame above the rearwardly moving upper discharge portion and disposed between the fingers, the guide cam extending over the discharge portion and terminating adjacent the outfeed conveyor system for transferring poultry from the fingers to the outfeed conveyor system.

3. The device of claim 1 in which the outfeed conveyor system comprises two transverse endless belts below the discharge end of the upper portion of the pickup conveyor, which belts move towards each other and towards an endless belt situated between them which conveys away from the pickup conveyor.

4. The device of claim 1 in which the outfeed conveyor system includes a regulating device comprising a rotatable disc surrounded by an endless wall with outlet opening at the side facing a container for packing poultry, said outlet opening being provided with a movable door, a slide plate being located between the said outlet opening and the edge of the container.

5. The device of claim 4 in which the wall with outlet opening and door is rotatable about the axis of rotation of the disc and the slide plate extends over the width of the range of rotation of the wall opening.

6. The device of claim 4 in which the door comprises two parts which are hingedly connected to each other, one of which, when viewed in the direction of rotation of the disc past the outlet opening is hingedly connected to the wall, while the second part is hingedly connected to the edge of the first part facing away from the wall and is held in an angular position in relation to the first part, means being provided for moving the door away from or towards the opening in such a way that the second part upon contact with the wall at a point in front of the opening slides over the wall against the direction of rotation during the closing movement.

7. The device of claim 1 including means at said one end of the main frame mounting the sub-frame thereon for adjusting the sub-frame between a raised, retracted position and a lowered, operative position for picking up poultry.

8. The device of claim 7 including support wheel means on the sub-frame arranged to engage a poultry support surface in the operative position of the sub-frame.

9. The device of claim 1 including pivot means on the said one end of the main frame mounting the sub-frame on the main frame for pivotal movement of the sub-frame about a horizontal axis, for adjusting the sub-frame between a raised, retracted position and a lowered, operative position for picking up poultry.

10. The device of claim 9 including power means interconnecting the main frame and sub-frame for pivoting the sub-frame.

* * * * *